United States Patent [19]
von Lange et al.

[11] Patent Number: 5,839,757
[45] Date of Patent: Nov. 24, 1998

[54] PROTECTION DEVICE FOR COMBINATION VEHICLES

[75] Inventors: Eberhard Hennig von Lange, Sindelfingen; Georgios Tsilchorozidis, Stuttgart, both of Germany

[73] Assignee: Mercedes-Benz AG, Stuttgart, Germany

[21] Appl. No.: 856,027

[22] Filed: May 14, 1997

[30] Foreign Application Priority Data

May 15, 1996 [DE] Germany ................... 196 19 642.6

[51] Int. Cl.⁶ .................................................. B60R 21/06
[52] U.S. Cl. ............................................. 280/749; 410/118
[58] Field of Search .................................. 280/749, 748; 244/121; 296/24.1; 410/118

[56] References Cited

U.S. PATENT DOCUMENTS

| | | | |
|---|---|---|---|
| 3,423,121 | 1/1969 | Lipkin | 280/749 |
| 5,632,520 | 5/1997 | Batz | 296/24.1 |
| 5,695,217 | 12/1997 | Ament et al. | 280/749 |

FOREIGN PATENT DOCUMENTS

4328746A1  3/1995  Germany .

Primary Examiner—Christopher P. Ellis
Attorney, Agent, or Firm—Evenson McKeown Edwards & Lenahan, PLLC

[57] ABSTRACT

The invention relates to a protection device for combination vehicles for separating a passenger compartment having seats from a cargo space situated behind it, which, for this purpose, has a safety net which spans a free area above the seating backrest to the vehicle roof and is mounted by way of an upper and a lower transverse tube in the vehicle. For meeting standards concerning the strength of the protection device and for the universal usability in combination vehicles, the upper transverse tube is the upper frame part of an approximately trapezoidal frame whose lower frame part, which is in parallel thereto, viewed in the driving direction, rests behind the safety net loosely against it. In the area of the lower frame part, the frame is held by means of fastening elements on the roof frame at a distance from the vehicle roof which is smaller than the frame height. The lower transverse tube is situated below the upper edge of the seating backrests and is mounted on the vehicle floor side by means of belt straps.

20 Claims, 5 Drawing Sheets

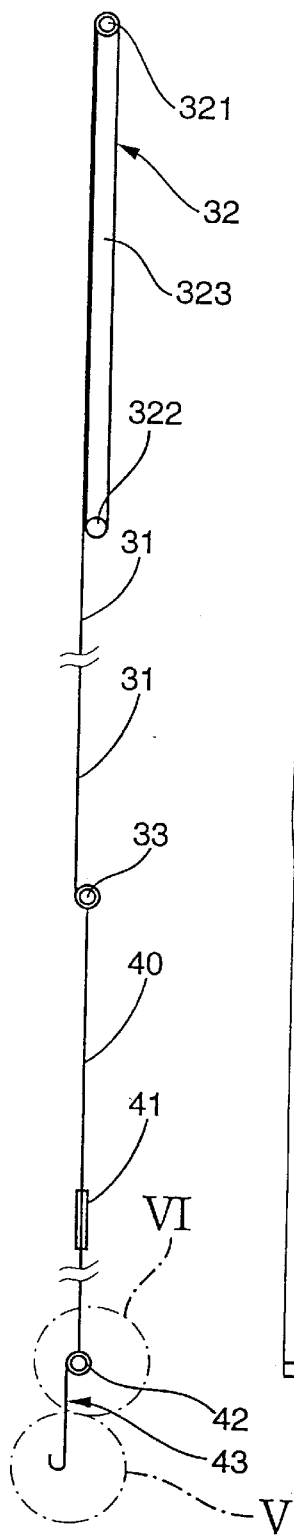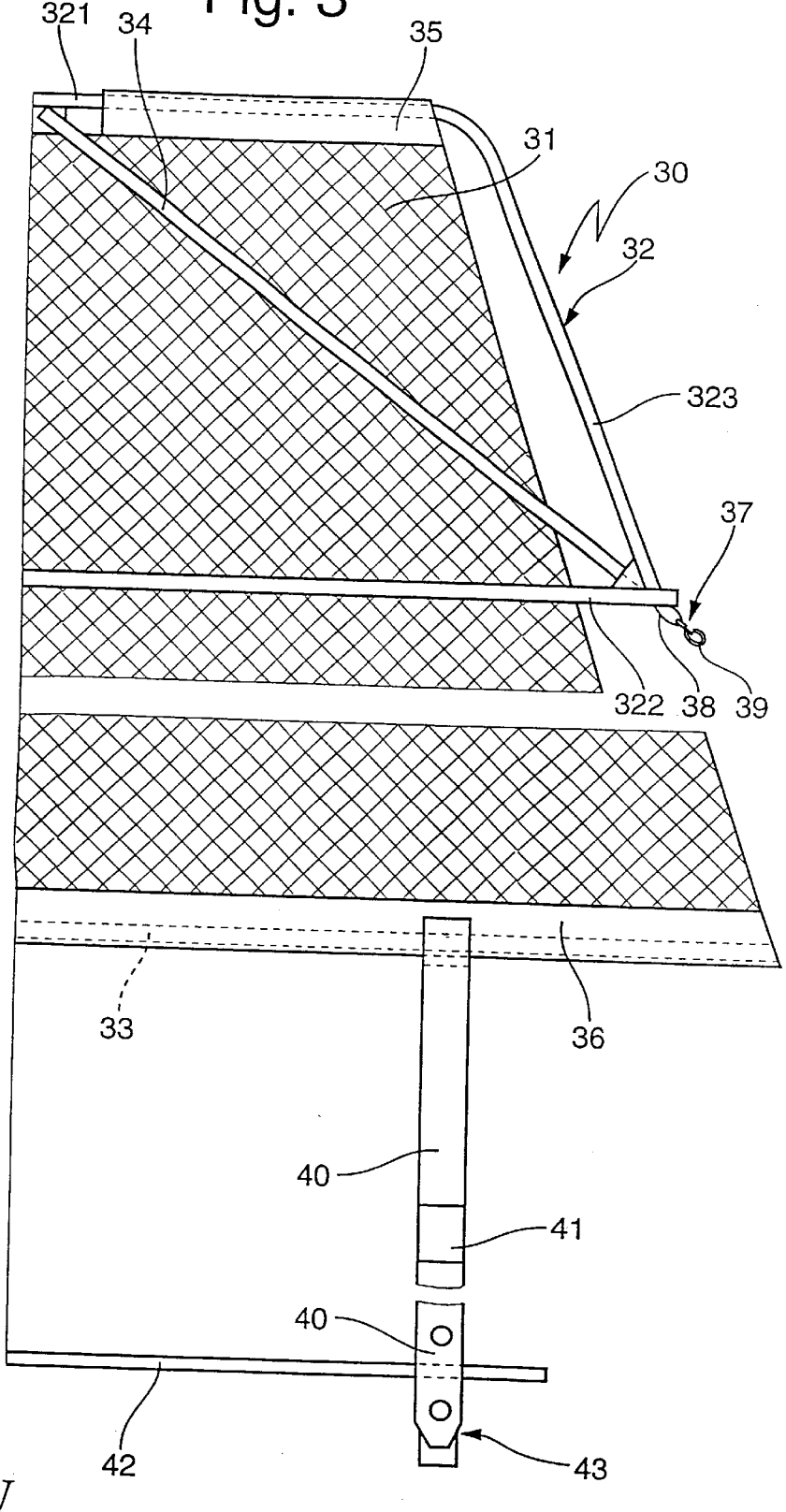

PROTECTION DEVICE FOR COMBINATION VEHICLES

BACKGROUND AND SUMMARY OF THE INVENTION

This application claims the priority of German application 196 19 642.6-22 filed in Germany on May 15, 1996, the disclosure of which is expressly incorporated by reference herein.

The invention relates to a protection device for combination vehicles for separating a passenger compartment containing seats from a cargo space situated behind it in the driving direction, having a safety net which spans at least the area between the upper edge of the seat backrests and the vehicle roof and which is fastened on an upper transverse tube extending along the vehicle width and a lower transverse tube which is parallel thereto, and having belt straps which are applied to the lower transverse tube and have belt buckles for the tensioning of the lower transverse tube in the downward direction.

In the case of a known protection device of this type (German Patent Document DE 43 28 746 A1), the upper transverse tube carries two mushroom-type heads on the end side by means of which it is hung on both sides in corresponding pockets of the two C-columns behind the rear seat of the combination vehicle. The lower transverse tube is anchored by way of two adjustable buckles in bows which are situated on the floor of the cargo space or in the backrest of the rear seat. For absorbing tension peaks on the two lateral edges of the safety net which occur in the case of a crash because of the deformation of the vehicle body or of the anchoring devices of the safety net and may lead to the tearing of the safety net, length compensation devices are provided in the form of taken-in folds which tear open and while consuming force permit a lengthening of the safety net. Finally, the forces absorbed by the safety net are introduced by way of the upper transverse tube into the C-columns and by way of the lower transverse tube and the buckles and bows into the vehicle floor of the vehicle body, whereby the respective anchoring points are loaded considerably.

It is an object of the invention to improve a protection device of the initially mentioned type such that it can be used in combination vehicles independently of their roof construction (high roof/low roof) and introduces the forces which occur when the protection device is stressed into the vehicle body in such a distributed manner that the anchoring points are less stressed.

In the case of a protection device for combination vehicles of the type referred to above, this object is achieved according to the invention by means of an arrangement wherein the upper transverse tube is an upper frame part of an approximately trapezoidal tube frame whose lower frame part is parallel thereto, and rests loosely behind the safety net, as viewed in the driving direction, and wherein the tube frame is fastened in the area of the lower frame part by means of self-aligning fastening elements on the vehicle at a distance from the vehicle roof which is smaller than the frame height.

The protection device according to the invention has the advantage that the tube frame on whose upper frame part the safety net is fastened and by whose lower frame part the safety net is only deflected and which itself is held by means of the fastening elements on the vehicle roof frame, is subjected to no bending stress when stopping the cargo sliding toward the front in the case of a crash. The safety net which is loaded by the forces of gravity of the cargo will deform and will lift off the lower frame part. In the process, the deforming safety net pulls the upper frame part toward the front, whereby the latter is pressed further upward and is supported on top at the vehicle roof. The supporting forces are therefore absorbed on top by the roof panel or the roof lining and by the roof frame. In this case, the fastening elements which align themselves will yield so that only low forces are introduced from the lower frame part into the roof frame and, for this purpose, anchoring points provided in the roof frame must not be constructed to be of a high strength. On the bottom, the forces acting upon the safety net are introduced by the lower transverse tube by way of the belt straps directly or by way of the seat feet of the vehicle seats, which are anchored on the floor, into the vehicle floor.

As the result of the arrangement of the protection device with the resulting introduction of force and load distribution, the load absorption can be ensured which is stipulated according to the standards, without the requirement of any cost-intensive reinforcing measures on the vehicle and on the protection device itself. The protection device will still be of a light weight and can be mounted and demounted rapidly and without any problems because only the elastic elements on the lower frame part of the tube frame must be hung into corresponding eyes or lugs provided at the vehicle and the belt straps must be braced by means of the belt tensioning devices on the vehicle floor. The tensile forces caused during the bracing on the safety net force the tube frame to carry out a swivel motion about its roof application points determined by the self-aligning fastening elements, until the upper frame part rests against the roof lining. The protection device is equally well suitable for the low-roof or the high-roof construction of the combination vehicle because the tube frame with the lower roof part is fastened on the roof frame and extends at an angle in the direction of the cargo space. According to the height of the roof, the bending of the tube frame with respect to the vertical line is larger or smaller. In both cases, when the net is stressed, the support of the upper frame part is achieved on the roof panel or lining.

Advantageous embodiments of the protection device according to the invention with expedient developments and further developments of the invention are indicated in the claims and in this specification.

According to an advantageous embodiment of the invention, the fastening elements are constructed as wire cables with spring snaps for the hanging in eye bolts or lugs provided on the roof frame of the combination vehicle on both longitudinal sides. As an alternative, holding units are used as fastening elements which permit a rotating of the tube frame about its lower frame part. These consist in each case of a bracket fastened on the roof frame; a bow which can be swivelled in the bracket in the vertical direction, thus toward the vehicle roof; and of a bolt which is held in the bow and which projects by means of a horizontally extending bolt end into the open front end of the lower frame part of the tube frame with a rotational play. If, in the case of a vehicle seat arrangement with several rows of seats arranged behind one another, two such eye bolts or lugs or holding units, which are situated opposite one another in the transverse direction of the vehicle, are provided behind each row of seats of the roof frame, the size of the cargo space can be individually varied in that seat rows without any chairs are included in the cargo space. In an extreme case, the protection device can be mounted directly behind the driver's and front passenger's seat. Holding units which are not required for the holding are simply folded onto the roof frame after the removal of the bolt.

Other objects, advantages and novel features of the present invention will become apparent from the following detailed description of the invention when considered in conjunction with the accompanying drawings.

BRIEF DESCRIPTION OF THE DRAWINGS

FIG. 3 is an enlarged cutout of a top view of the protection device in FIGS. 1 and 2;

FIG. 4 is a lateral view of the protection device in FIG. 3;

DETAILED DESCRIPTION OF THE DRAWINGS

Figure 1:
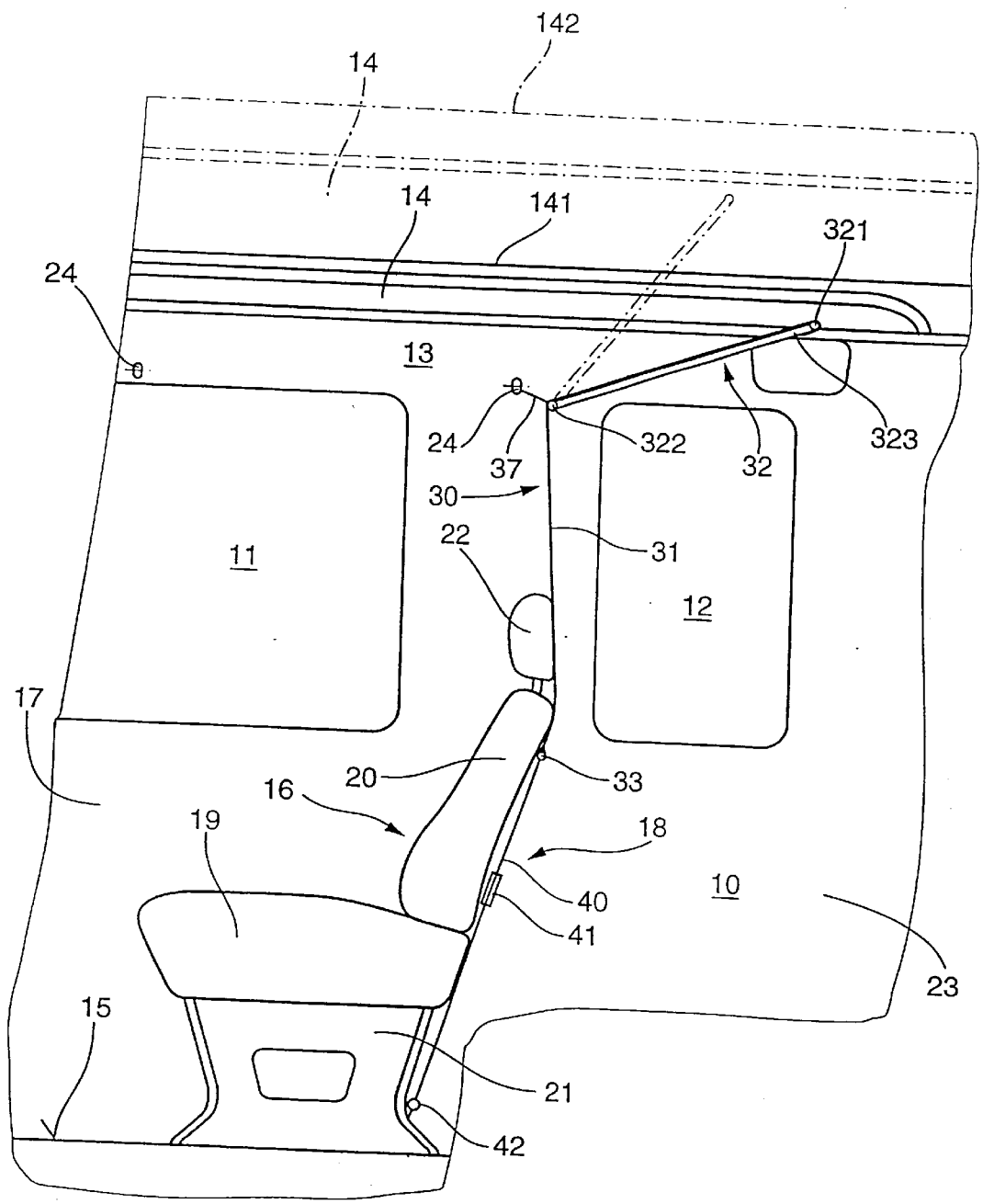
FIG. 1 is a longitudinal sectional partial view of a combination vehicle, depicted in the low-roof and high-roof construction, and having a protection device for separating the vehicle occupant space from the cargo space, constructed according to a preferred embodiment of the present invention.

FIG. 1 illustrates a longitudinal sectional cutout of a combination vehicle or a small transport vehicle. The vehicle body side wall 10 is shown which is on the right in the driving direction and has side windows 11 and 12, a roof frame 13, a vehicle roof 14, a vehicle floor 15 and seats 16. In this embodiment, the roof line of the vehicle roof 14 in its construction as a low roof is marked with reference number 141 and the roof line in the construction of the vehicle roof 14 as a high roof is marked by reference number 142. For the seating 16 arranged in the so-called passenger compartment 17, the last three-seat bench 18 is visible in FIGS. 1 and 2 and is one of several seat benches arranged in rows behind one another in the longitudinal direction of the vehicle. The seat bench 18 which, in a known manner, consists of the seat part 19 and the backrest 20 is anchored to the vehicle floor 15 by way of three seat feet 21. Each seat of the three-seat bench 18 is equipped with a headrest 22. Behind the last seat bench 18, the passenger compartment 17 is without any separation adjoined by a cargo space 23 for receiving cargo of any type.

Figure 2:
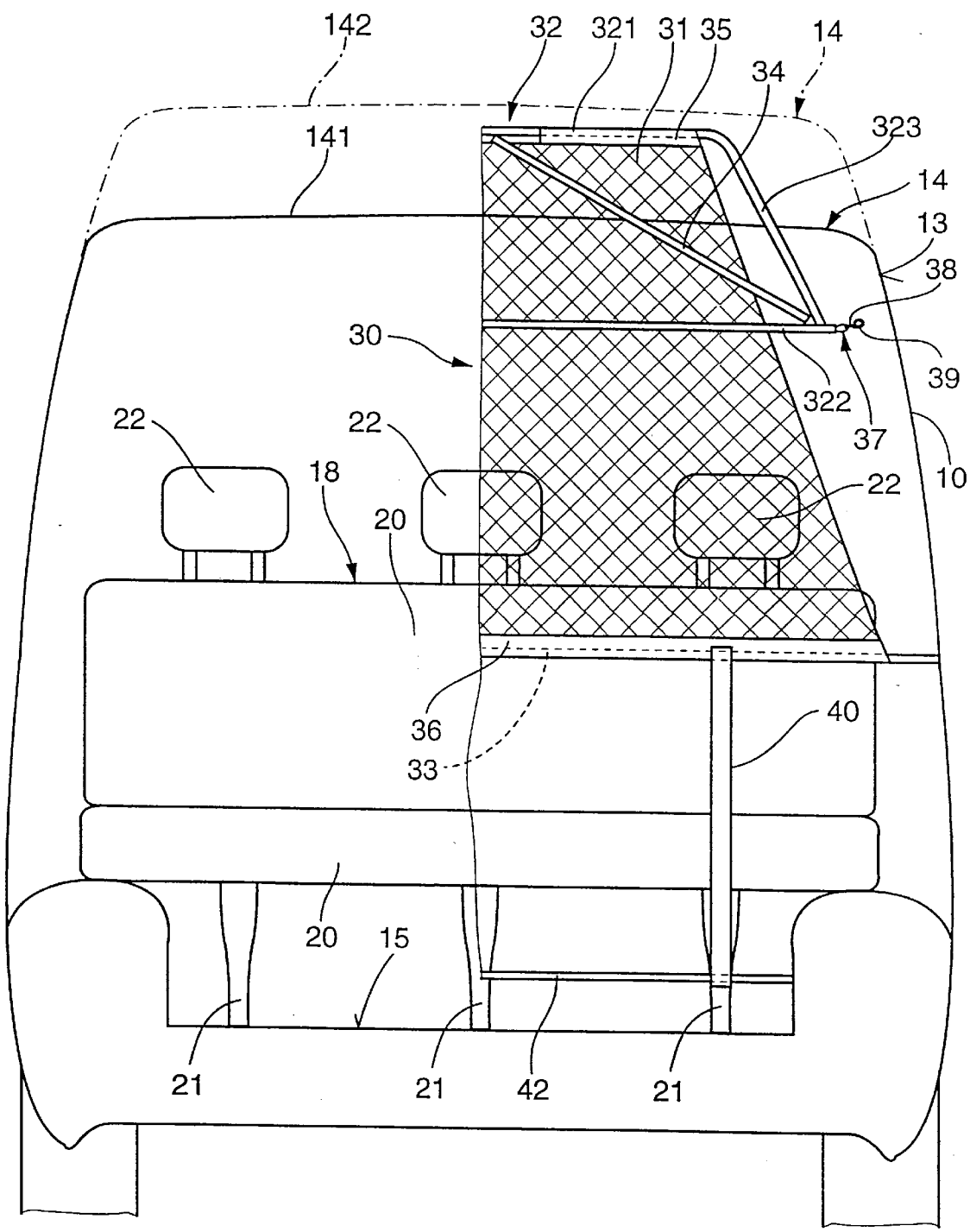
FIG. 2 is a cross-sectional view of the combination vehicle in FIG. 1 with a top view of the only partially shown protection device from the rear.

For protecting the vehicle occupants against unfastened cargo in the cargo space 23, which during extreme braking or in the case of a crash is shifted toward the front into the passenger compartment 17 in an uncontrolled manner, the passenger space 17 is separated from the cargo space 23 by a flexible detachably mounted protection device 30 which can rapidly and easily be mounted and demounted in the combination vehicle. The protection device 30 has safety net 31 which is mounted between the passenger compartment 17 and the cargo space 23 between the vehicle roof 14 and the vehicle floor 15 and spans at least the area between the upper edge of the backrest 20 of the seat bench 18 and the vehicle roof 14. FIGS. 2 and 3 are top views of half a side of the protection device 30 and FIGS. 1 and 4 are side views.

For the mounting of the safety net 31, the protection device 30 has a trapezoidal tube frame 32 which is composed of an upper frame part 321, a lower frame part 322 and two side members 323 which connect the frame parts 321, 322 with one another and extend diagonally toward one another, as well as of a lower transverse tube 33 which extends behind the backrest 20 approximately 200 mm below the upper edge of the backrest 20 from one side wall 10 of the vehicle body to the other vehicle body side wall 10. The height of the tube frame 32 is higher than the distance between the roof frame 13 and the roof line 142 in the construction of the vehicle roof 14 as a high roof. For reinforcing the tube frame 32, two transverse struts 34 are used which extend in each case approximately from the center of the upper frame part 321 to the junction of the lower frame part 322 with the two side members 323. By means of sewn-on upper loops 35, the safety net 31 is fastened to the upper frame part 321 and by way of lower loops 36 of the same type, it is fastened to the lower transverse tube 33.

On both ends, the lower frame part 322 carries self-aligning fastening elements 37 which are used for fastening the tube frame 32 to the roof frame 13. In the present embodiment, the fastening elements 37 are constructed as wire cables 38 having spring snaps 39. As illustrated in FIG. 1, lugs 34 or so-called eye bolts are fastened on the roof frame 13 into which the spring snaps 39 can be hung. Two eye bolts or lugs 24 respectively are provided in the transverse direction of the vehicle mutually opposite one another behind each seat bench 18 on the roof frame 13 so that the protection device 30 can be mounted at different points in the vehicle and the sizes of the zones of the passenger compartment 17 and the cargo space 23 determined by it can be made to be variable. Two belt straps 40 with belt buckles 41 are applied to the lower transverse tube 33 and are anchored on the end away from the transverse tube indirectly or directly on the vehicle floor 15 (FIG. 1–4).

For mounting the protection device 30, the tube frame 32 is hung by means of the snap rings 39 fastened to the lower frame part 322 by means of the wire cables 38 into the two lugs 24 on the roof frame 13 which are situated opposite one another in the transverse direction of the vehicle. The safety net 31, which is fastened on the end side on the upper frame part 321 rests loosely on the lower frame part 322 and is deflected by it. In this case, the lower frame part 322 points to the cargo space 23, while, viewed from the passenger compartment 17, the safety net 31 covers the lower frame part 322. Below the upper edge of the backrest 20 of the seat bench 18, the lower transverse tube 33 rests against the backrest 20. The two belt straps 40 are anchored on the end side indirectly or directly in the vehicle floor 15, and the safety net 31 is stretched by means of the two belt buckles 41 in the belt straps 40. The resulting tensile forces force the tube frame 32 to carry out a swivel movement about its self-aligning roof suspension points formed by the two wire cables 38 and spring snaps 39 until the upper frame part 321 rests against the vehicle roof 14 or on the roof panelling situated below it.

If unsecured cargo is disposed on the cargo surface and the combination vehicle is braked in an extreme fashion, the cargo will experience an acceleration toward the front, in which case it is caught by the safety net 31. The forces of gravity of the cargo load the safety net 31 which will deform and lift off the lower frame part 322 of the tube frame 32. This deformation of the safety net 31 promotes the swivel motion of the tube frame 32 toward the front and, because of the loading, the tube frame 32 will pull on the self-aligning suspension points and be supported on top on the vehicle roof 14. The loading forces caused by the cargo are therefore absorbed by the vehicle roof 14 and the roof frame 13. On the bottom, they are introduced by way of the transverse tube 33 and the belt straps 40 into the vehicle floor 15. As illustrated in FIG. 1, the protection device 30 can be installed and is operable irrespective of whether the combination vehicle is constructed with a high roof (roof line 142) or with a low roof (roof line 141). In both cases, during the stretching of the safety net by means of the belt buckles 41 in the belt straps 40 and the loading of the safety net 31 by cargo shifting toward the front, the tube frame 32 will be supported on the vehicle roof 14. In the case of the low-roof construction, the tube frame 32 is disposed slightly flatter and, in the case of the high-roof construction, it is disposed to be slightly steeper. The latter is indicated in FIG. 1 by a dash-dotted representation of the tube frame 32.

Figure 5:
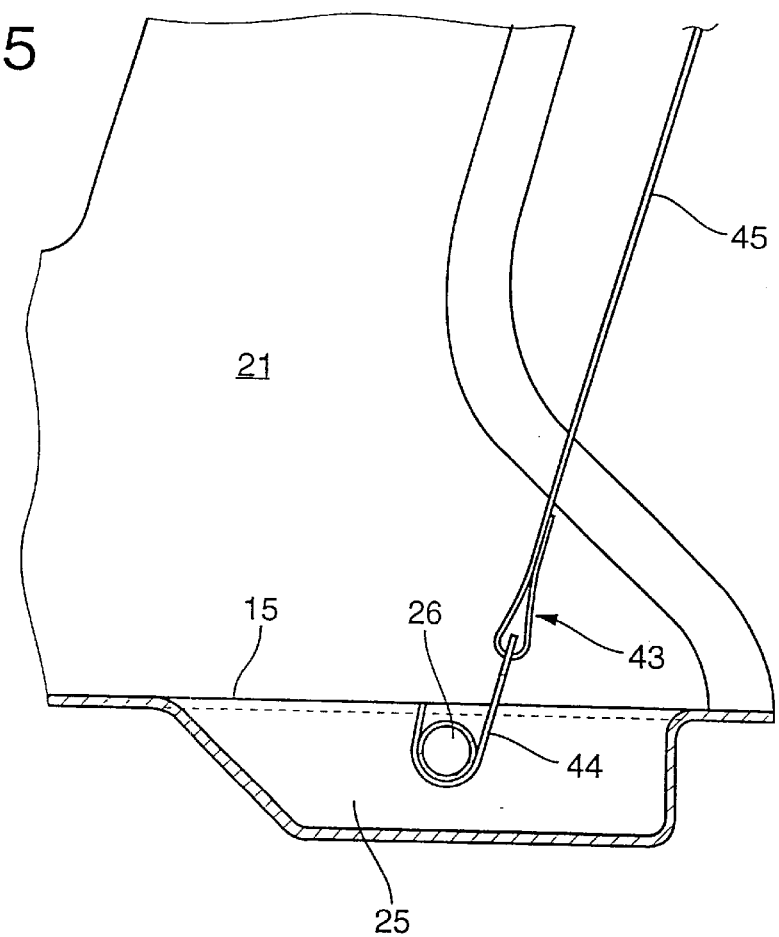
FIG. 5 is an enlarged representation of the cutout V in FIG. 4.

The vehicle-floor-side fixing of the two belt straps 40 applied to the lower transverse tube 33 can have different designs. In all cases, the two belt straps 40 applied to the transverse tube 33 are fixed on the end side on an anchoring tube 42 which extends below the transverse tube 33 in parallel and at a distance from the transverse tube 33. By means of anchoring elements, this anchoring tube 42 is fixed either directly in the vehicle floor 15 to anchoring points correspondingly provided there or is fixed in corresponding anchoring points in the seat feet of the seat bench 18 which, in turn, is anchored on the vehicle floor 15. In the embodiment according to FIGS. 1 to 4, the anchoring elements 43 are constructed as hooks 44 which are connected with the anchoring tube 42 by means of tie rods 45. FIG. 5 is an enlarged illustration of the anchoring of a hook 44 in the vehicle floor 13. Below the seat bench 18, in a trough 25 formed in the vehicle floor 15, a cross bolt 26 is situated which is used for anchoring the seat foot 21 on the vehicle floor 15. The hook 44 is also hung on this cross bolt 26, specifically when the belt buckles 41 are released, as illustrated in FIG. 5. By means of the belt buckles 41 in the two belt straps 44, the safety net 31 can now be stretched as described above.

Figure 6:
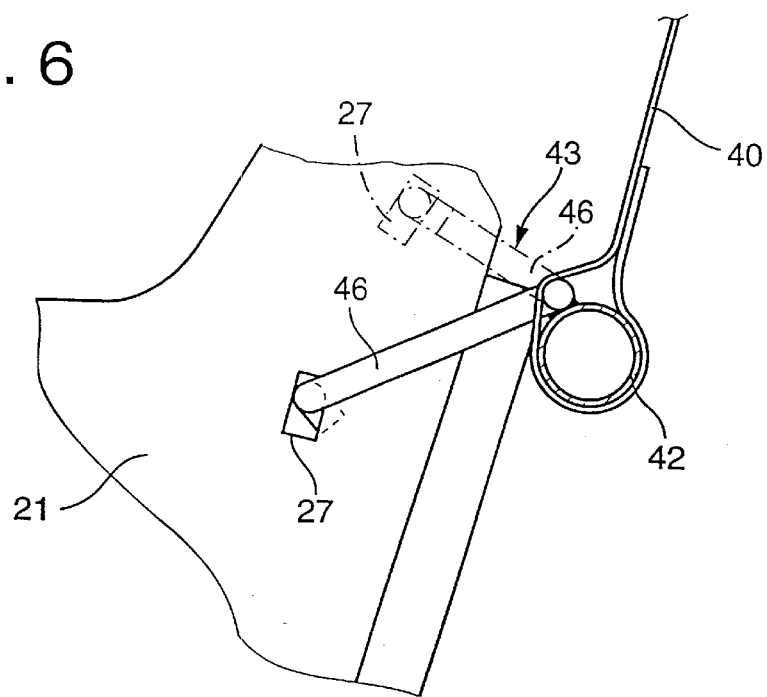
FIG. 6 is an enlarged representation of the cutout VI in FIG. 4 of a modified embodiment.

In an alternative embodiment of the anchoring elements 43 illustrated in FIG. 6, these are constructed as wire bows 46 which are welded to the anchoring tube 42. In this case, as many wire bows 46 are welded on as there are seat feet 21 on the seat bench situated in front of the protection device 30. In each seat foot 21, shaped holes 27 are provided in the rear upper area into which the wire bows 46 are hung by means of bent wire ends on both sides of the seat foot 21.

The above-described anchoring elements 43 for the anchoring tube 42 can be used as an alternative. If, for example, an only two-seat bench is arranged in front of the protection device 30 instead of a three-seat bench 18, the two described embodiments of the anchoring elements 43 are also used additively. On the left, the anchoring tube 42 will then be hung by means of the wire bows 46 into the shaped holes 27 on the seat foot 21, and on the right, the anchoring tube will be anchored in the vehicle floor 15 by means of the tie rod 45 and the hook 44. If the protection device 30 is arranged directly behind the driver's and front passenger's seat, the anchoring tube 42 will be fastened by way of tie rods 45 and hooks 44 on the seat boxes of the front seats.

Figure 7:
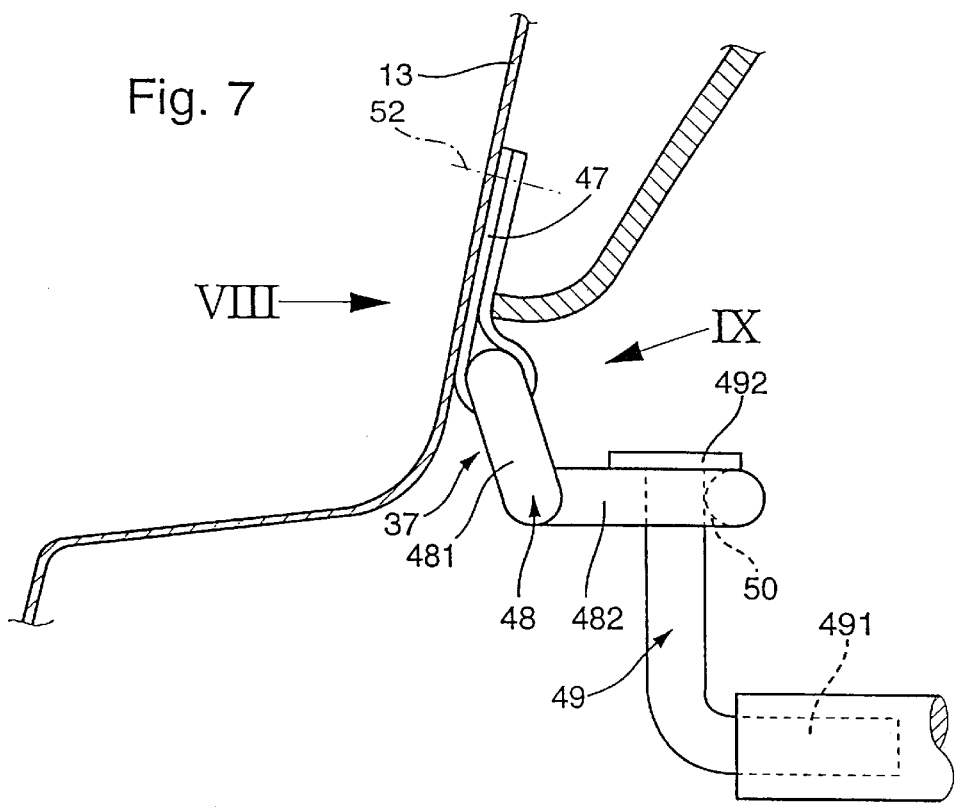
FIG. 7 is a cutout of the roof area of the combination vehicle with a modified construction of a fastening element for the linking of the protection device.
Figure 8:
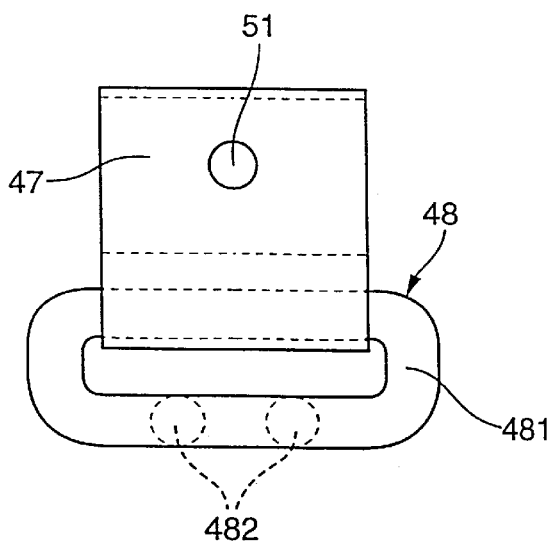
FIG. 8 is a view of the fastening element without the bolt in the direction of the arrow VIII in FIG. 7.
Figure 9:
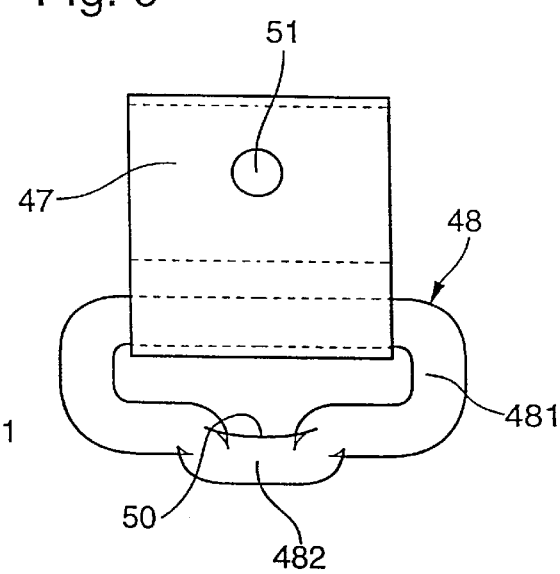
FIG. 9 is a view of the fastening element without the bolt in the direction of the arrow IX in FIG. 7.

FIGS. 7 to 9 are different views of an alternative fastening element 37 for fastening the tube frame 32 on the roof frame 13. This fastening element 37 is formed by a two-part holding unit which makes it possible that the tube frame 32 can swivel about the axis of its lower frame part 322 and can therefore support itself by means of its upper frame part 321 on the vehicle roof 14. Specifically, one part of the holding unit is composed of a bracket 47 fastened on the roof frame 13 of the vehicle and of a bow 48 which can be swivelled in the vertical direction in the bracket 47. The bracket 47 is constructed as a bent sheet metal part with a bent-out eye 471 and the bow is bent as an approximately T-shaped wire bow whose transverse part 481 rests swivellably in the eye 471 and whose center part 482 has an opening 50. As illustrated in FIG. 7, the center part 482 and the transverse part 481 are bent with respect to one another at an obtuse angle of approximately 100°. For the fastening on the roof frame 13, a passage bore 51 is provided in the bracket 47; as an alternative, two passage bores are provided which are arranged at a distance from one another and through which a cap screw 52 can be fitted. The cap screw 52 indicated by a dash-dotted line in FIG. 7 is screwed into a corresponding threaded bore in the roof frame 13.

The second part of the holding unit consists of a bolt 49 with a bolt head 492 and a bolt end 491 bent at a right angle. The bolt 49 is fitted through the opening 50 in the center part 482 of the bow 48 and, by means of its bolt head 492, rests on the top side of the center part 482. The bolt end 491 bent at a right angle projects into the open front end of the lower frame part 322 of the tube frame 32 with a rotational play so that the lower frame part 322 can rotate on the two bolt ends 491 of two fastening elements 37 projecting on the left and the right into the front ends.

When no protection device is used or when the device is mounted behind another row of seats between the two holding units, the two bolts 49 are pulled out of the two holding devices which are no longer needed and the bow 48 in the bracket 47 is folded against the roof frame 13.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Protection device for combination vehicles for separating a passenger compartment containing seats from a cargo space situated behind it in the driving direction, having a safety net which spans at least the area between the upper edge of the seat backrests and the vehicle roof and which is fastened on an upper transverse tube extending along the vehicle width and a lower transverse tube which is parallel thereto, and having belt straps which are applied to the lower transverse tube and have belt buckles for the tensioning of the lower transverse tube in the downward direction, wherein the upper transverse tube is an upper frame part of an approximately trapezoidal tube frame whose lower frame part is parallel thereto and rests loosely behind the safety net, as viewed in the driving direction, and wherein the tube frame is fastened in the area of the lower frame part by means of self-aligning fastening elements on the vehicle at a distance from the vehicle roof which is smaller than the frame height.

2. Protection device according to claim 1, wherein the distance of the lower transverse tube from the upper edge of the seat backrests is approximately 200 mm.

3. Protection device according to claim 1, wherein the fastening elements are constructed as wire cables having snap rings for a hanging into eye bolts or lugs provided on the roof frame of the vehicle on both longitudinal sides.

4. Device according to claim 1, wherein the fastening elements in each case comprise:

a bracket fastened to the roof frame of the vehicle, a bow which can be swivelled in the vertical direction in the bracket, a bolt held in the bow, which bow projects by means of a horizontally extending bolt end into the open front end of the lower frame part of the tube frame with a rotational play.

5. Device according to claim 4, wherein the bracket is constructed as a bent sheet metal part with a bent-out eye and the bow is constructed as a wire bow bent approximately in a T-shape, whose transverse part rests in the eye in a swivellable manner and whose center part leaves open an opening for the fitting-through of the bolt, and wherein the bolt has a bolt head which rests on the top side of the center part and the bolt end engaging in the lower frame part is bent away from the bolt at a right angle.

6. Device according to claim 5, wherein the center part and the transverse part are bent with respect to one another at an obtuse angle.

7. Device according to one of claims 1, wherein the belt straps with belt buckles are fastened with their end facing away from the lower transverse tube to an anchoring tube extending in parallel to the lower transverse tube, which anchoring tube can be fixed by means of anchoring elements to the vehicle floor or close to it on the seating.

8. Device according to claim 7, wherein the anchoring elements have hooks for a hanging into vehicle-floor-side holding bolts which are directly or by way of connection elements, preferably tie rods, fastened to the anchoring tube.

9. Device according to claim 7, wherein the anchoring elements are constructed as wire bows which are fastened, preferably welded, to the anchoring tube, and hung into shaped holes in seat feet of seat benches of the vehicle seats.

10. Device according to claim 3, wherein the distance of the lower transverse tube from the upper edge of the seat backrests is approximately 200 mm.

11. Device according to claim 4, wherein the distance of the lower transverse tube from the upper edge of the seat backrests is approximately 200 mm.

12. Device according to claim 5, wherein the distance of the lower transverse tube from the upper edge of the seat backrests is approximately 200 mm.

13. Device according to claim 7, wherein the distance of the lower transverse tube from the upper edge of the seat backrests is approximately 200 mm.

14. Device according to claim 3, wherein the belt straps with belt buckles are fastened with their end facing away from the lower transverse tube to an anchoring tube extending in parallel to the lower transverse tube, which anchoring tube can be fixed by means of anchoring elements to the vehicle floor or close to it on the seating.

15. Device according to claim 4, wherein the belt straps with belt buckles are fastened with their end facing away from the lower transverse tube to an anchoring tube extending in parallel to the lower transverse tube, which anchoring tube can be fixed by means of anchoring elements to the vehicle floor or close to it on the seating.

16. Device according to claim 5, wherein the belt straps with belt buckles are fastened with their end facing away from the lower transverse tube to an anchoring tube extending in parallel to the lower transverse tube, which anchoring tube can be fixed by means of anchoring elements to the vehicle floor or close to it on the seating.

17. Device according to claim 8, wherein the anchoring elements are constructed as wire bows which are fastened, preferably welded, to the anchoring tube, and hung into shaped holes in seat feet of seat benches of the vehicle seats.

18. Protection device for combination vehicles for separating a passenger compartment containing seats from a cargo space situated behind it in the driving direction, having a safety net which spans at least the area between the upper edge of the seat backrests and the vehicle roof and which is fastened on an upper transverse tube extending along the vehicle width and a lower transverse tube which is parallel thereto, and having a tensioning arrangement which in use tensions the lower transverse tube in the downward direction, comprising a tubular frame formed of the upper transverse tube and a parallel lower frame tube, said lower frame tube being disposed in use above the lower transverse tube and forward of the upper transverse tube to form a deflection member for the safety net resting loosely against a rear side of the lower frame tube.

19. Protective device according to claim 18, wherein the lower frame tube when in an in use position is disposed substantially above the seat back rests.

20. Protection device according to claim 19, wherein the lower transverse tube when in an in use position is disposed between 150 mm and 250 mm below upper edges of the backrests.

\* \* \* \* \*